United States Patent [19]

Kumagai

[11] Patent Number: 5,319,790
[45] Date of Patent: Jun. 7, 1994

[54] APPARATUS AUTOMATICALLY ENTERING MODE FOR STORING DOCUMENT AND MODE FOR READING DOCUMENT IN RESPONSE TO REPRESENTATIVE DATA INDICATING WHETHER STORED DOCUMENT EXISTS CORRESPONDING TO INPUT TITLE

[75] Inventor: Kaoru Kumagai, Tokyo, Japan

[73] Assignee: Canon Kabushiki Kaisha, Tokyo, Japan

[21] Appl. No.: 898,359

[22] Filed: Jun. 12, 1992

Related U.S. Application Data

[63] Continuation of Ser. No. 364,536, Jun. 12, 1989, abandoned, which is a continuation of Ser. No. 96,244, Sep. 8, 1987, abandoned, which is a continuation of Ser. No. 608,801, May 10, 1984, abandoned.

[30] Foreign Application Priority Data

May 20, 1983 [JP] Japan .................. 58-87495

[51] Int. Cl.⁵ .............................. G06F 15/40
[52] U.S. Cl. .................. 395/800; 364/706; 364/419.19; 364/231.1; 364/231.2; 364/927; 364/948.1; 364/962; 364/963; 364/963.3; 364/DIG. 2; 400/63; 400/76; 400/83
[58] Field of Search .......... 395/800, 600; 364/706, 364/419; 400/63, 76, 83

[56] References Cited

U.S. PATENT DOCUMENTS

| | | | |
|---|---|---|---|
| 4,117,542 | 9/1978 | Klansner et al. | 364/900 |
| 4,193,120 | 3/1980 | Yello | 364/900 |
| 4,215,422 | 7/1980 | McCray et al. | 364/900 |
| 4,313,213 | 1/1982 | Farina et al. | 455/186 X |
| 4,317,183 | 2/1982 | Shimizu et al. | 364/900 |
| 4,437,127 | 3/1984 | Hirose | 364/900 |
| 4,445,795 | 5/1984 | Levine et al. | 400/68 X |
| 4,485,454 | 11/1984 | Kimoto | 364/900 |
| 4,503,515 | 3/1985 | Cuan et al. | 364/900 |
| 4,553,860 | 11/1985 | Imaizumi et al. | 364/900 X |
| 4,615,631 | 10/1986 | Ueda et al. | 400/83 X |

OTHER PUBLICATIONS

Naiman "Introduction to Word Star", 1982, pp. 22-25.
Curtin "The Wordstar Handbook", 1983, pp. 28-29.

*Primary Examiner*—Thomas C. Lee
*Assistant Examiner*—Paul Harrity
*Attorney, Agent, or Firm*—Fitzpatrick, Cella, Harper & Scinto

[57] ABSTRACT

A system for registering and calling documents in a character processing unit includes a memory for storing character string information and title information associated with the character string information, and a display for displaying the title information stored in the memory. An entry device enters the title information and a call device calls the relevant character string information from the memory by entering the title information associated with the title information displayed on the display from the entray device. A registration device registers a new character string by entering the title information which is not stored in the memory device and reads out a character string which is stored in the memory device.

10 Claims, 12 Drawing Sheets

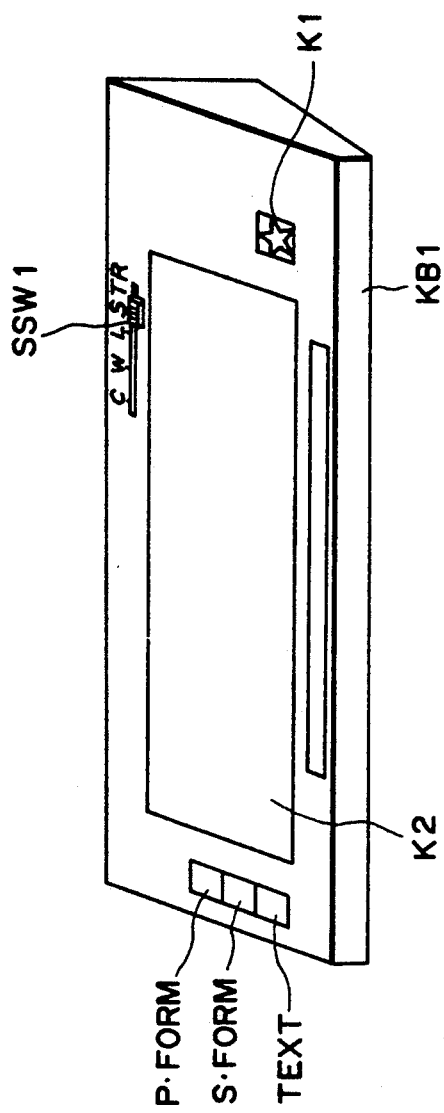

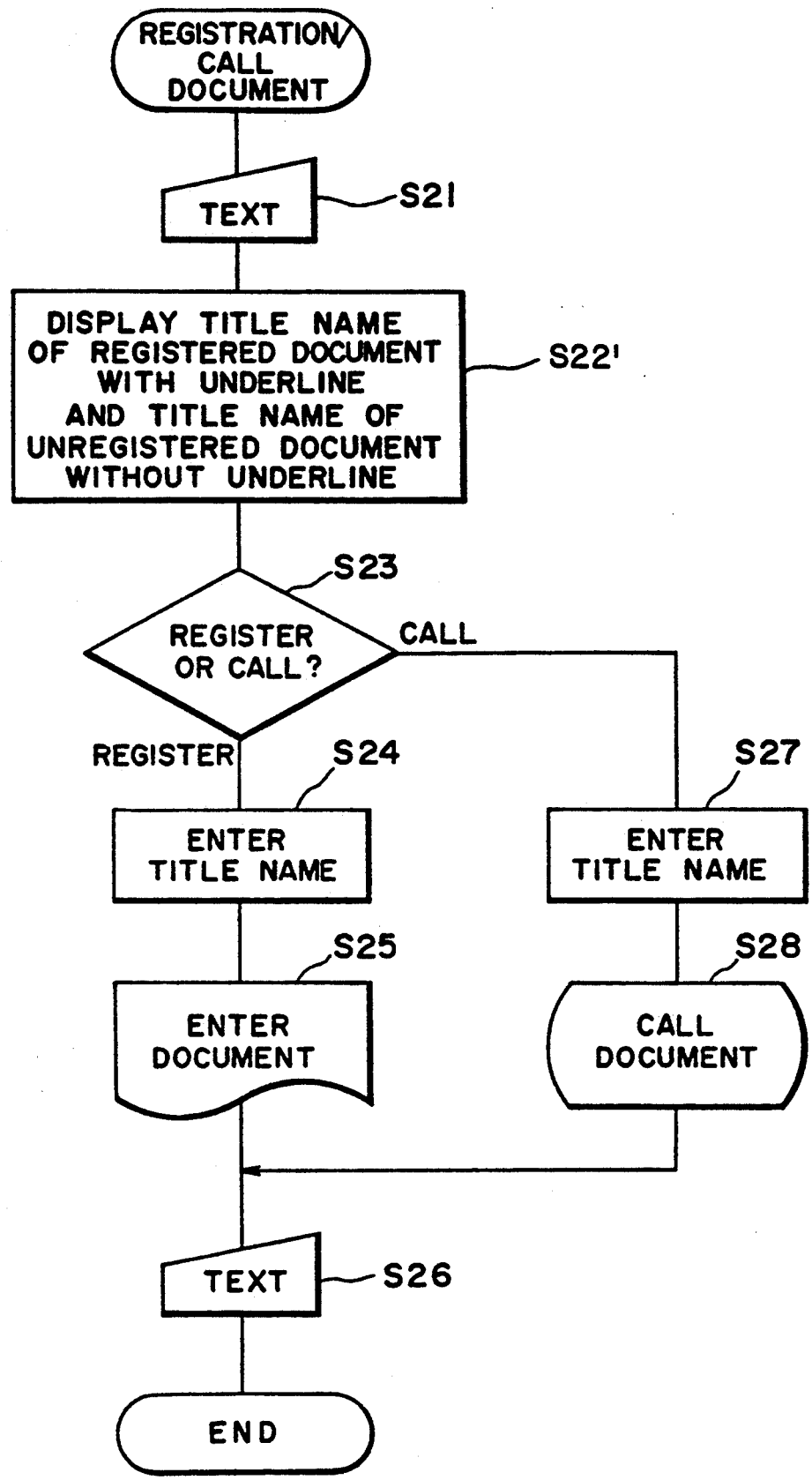
FIG. II

APPARATUS AUTOMATICALLY ENTERING MODE FOR STORING DOCUMENT AND MODE FOR READING DOCUMENT IN RESPONSE TO REPRESENTATIVE DATA INDICATING WHETHER STORED DOCUMENT EXISTS CORRESPONDING TO INPUT TITLE

This application is a continuation of application Ser. No. 07/364,536, filed Jun. 12, 1989, now abandoned, which is a continuation of application Ser. No. 07/096,244, filed Sep. 8, 1987, now abandoned, which is a continuation of application Ser. No. 06/608,801, filed May 10, 1984, now abandoned.

BACKGROUND OF THE INVENTION

1. Field of the Invention

The present invention relates to a character processing unit and, more particularly, to a document registering/calling system in a character processing unit which is provided with a memory and which can store a character string, i.e, sentences, in this memory and can print or display the character string stored.

2. Description of the Prior Art

Conventionally, electronic equipment of this kind, for example, character processing units such as an electronic typewriter or word processor can process a great amount of information and can store and hold sentences or various information necessary for typing.

In case of storing such various information, the operator arbitrarily gives titles to the respective information, thereby enabling desired information to be easily registered and called on the basis of the titles.

FIG. 1 illustrates a keyboard unit KB1 of an electronic typewriter as an example of the conventional character processing unit of this kind.

In the diagram, SSW1 denotes a slide switch and its rightmost position STR instructs the registration into a memory, while the other positions C, W and L instruct the mode to specify the method for registration of, for example, every character, every word, every line, or the like.

A key switch P.Form instructs the registration or recall of the information regarding a page format, namely, a tab and a margin and the like for a particular form. A key switch S.FORM instructs the registration or recall of the top position information with respect to a stop position form, i.e., top position information of each entry portion of a particular chit. A key switch TEXT instructs the registration or recall of a document. A key switch K1 (☆) instructs a delimiter and the like during the operation. K2 is a character key group having keys for characters such as alphabetic characters, Katakana characters, numerical characters, symbols, etc.

FIG. 2 shows the outside appearance of a display which is used in combination with the keyboard shown in FIG. 1, for instance a liquid crystal display DSP of 30 digits in total. This display DSP shown in FIG. 2 is generally disposed in the upper portion of the keyboard of FIG. 1 and is used ordinarily to display characters to be entered.

FIG. 3 is a flowchart showing the operations to register a document in the conventional character processing unit of this kind.

First, the new registration is instructed by setting the slide switch SSW1 at the mark STR in step S1. The key switch TEXT is pressed in step S2, then one character key among 26 characters of alphabet keys A to Z, for example, is entered as an arbitrary title name using the character key group K2 in step S3. Subsequently, the key switch K1 is pressed in step S4 to start the entering operation of the document in step S5. Upon completion of the document entry, the key switch TEXT is again pressed in step S6, thereby finishing the registration processing.

FIG. 4 is a flowchart showing the calling or recalling operation of the document in the conventional character processing unit of this kind.

First, the slide switch SSW1 is set at a mark other than STR in step S11 to instruct the call of the document which has been already registered. Then, the key switch TEXT is pressed in step S12 and the title name of the document (one character) which has been registered is entered in step S13. The key switch K1 is pressed in step S14 and subsequently the registered document is corrected or printed in step S15, then the key switch TEXT is pressed in the next step S16, thereby finishing the call processing of the document.

The conventional document registering/calling processing mentioned above is complicated since the slide switch SSW has to be switched whenever the document is registered and called. Moreover, it has a drawback such that it is necessary for the operator to completely memorize the title names of the registered documents and the title names of the unregistered documents.

OBJECT OF THE INVENTION

It is an object of the present invention to eliminate the above-described conventional drawbacks and to provide a document registering/calling system in a character processing unit which can assuredly register and call desired information into and from a memory on the basis of a title by an extremely simple operation in this way.

SUMMARY OF THE INVENTION

To accomplish the above object, according to the present invention, there is provided a document registering/calling system in a character processing unit, which comprises: a memory device for storing character string information and title information relative to the character string information; a display device for displaying the title information stored in the memory device; an entry device for entering the title information; a call device for calling the relevant character string information from the memory device by entering the title information corresponding to the title information displayed on the display device from the entry device; and a registration device for registering a new character string by entering the title information which is not stored in the memory device.

BRIEF DESCRIPTION OF THE DRAWINGS

FIG. 1 is a diagram showing a keyboard unit in a conventional character processing unit;

FIG. 2 is a diagram showing a display in the same;

FIG. 11 and FIGS. 12A, 12B when arranged according to FIG. 12 are flowcharts to describe the operations in another embodiment of the invention.

DETAILED DESCRIPTION OF THE PREFERRED EMBODIMENTS

Figure 3:
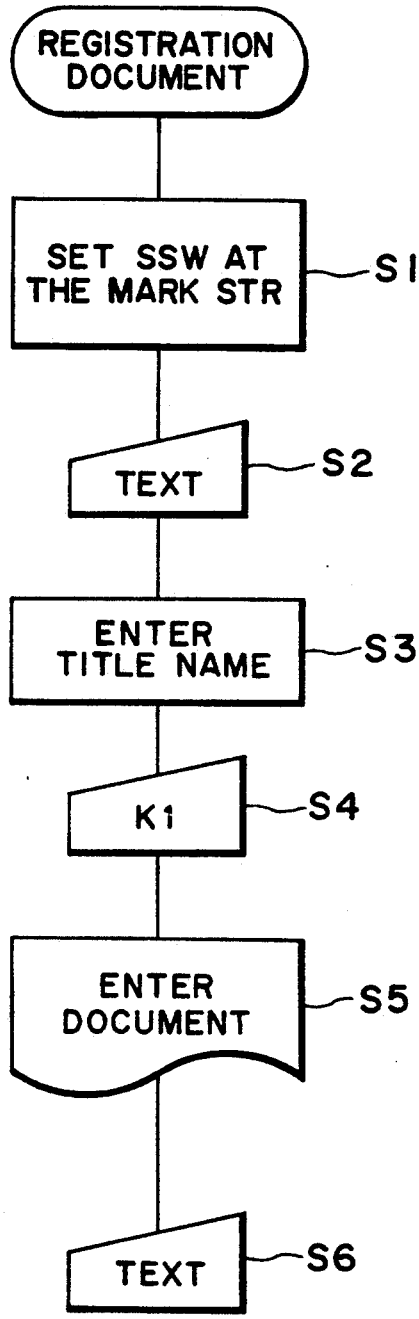
FIG. 3 is a flowchart showing the conventional document registration procedure.
Figure 4:
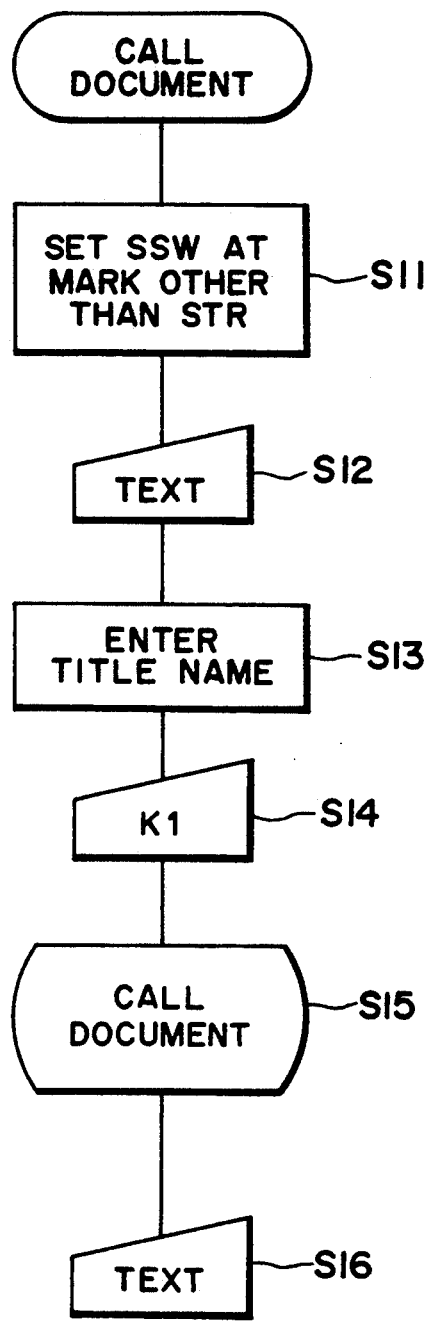
FIG. 4 is a flowchart showing the conventional document call procedure.
Figure 5:
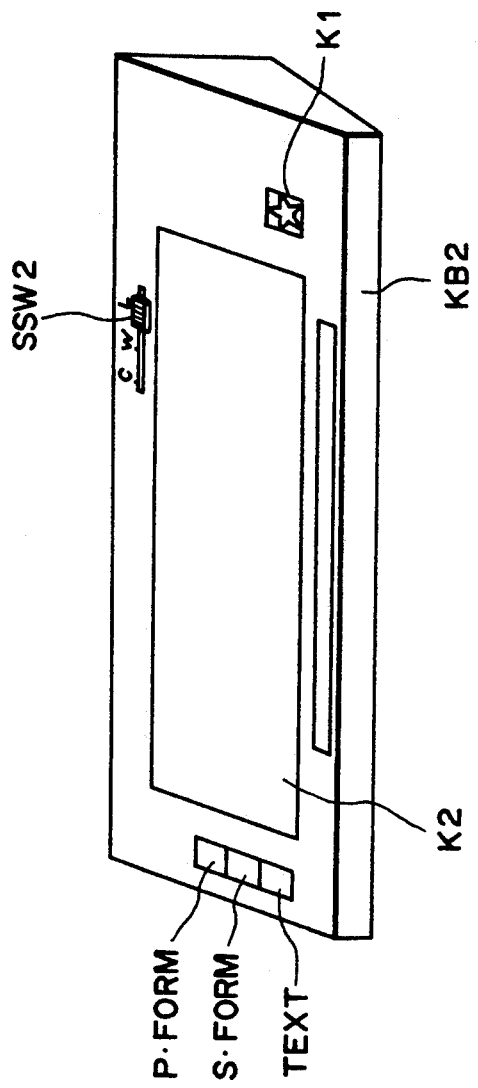
FIG. 5 is a diagram showing a keyboard unit in a character processing unit according to the present invention.

As shown in FIG. 5, in the present invention, the mark STR is removed from a slide switch SSW2 on the keyboard unit KB2 and even when the slide switch SSW2 is at any other mark, only pressing the key switch TEXT allows the document registration or call to be started. The remaining constitution of the slide switch SSW2 is substantially the same as the slide switch SSW1 shown in FIG. 1.

Figure 6:
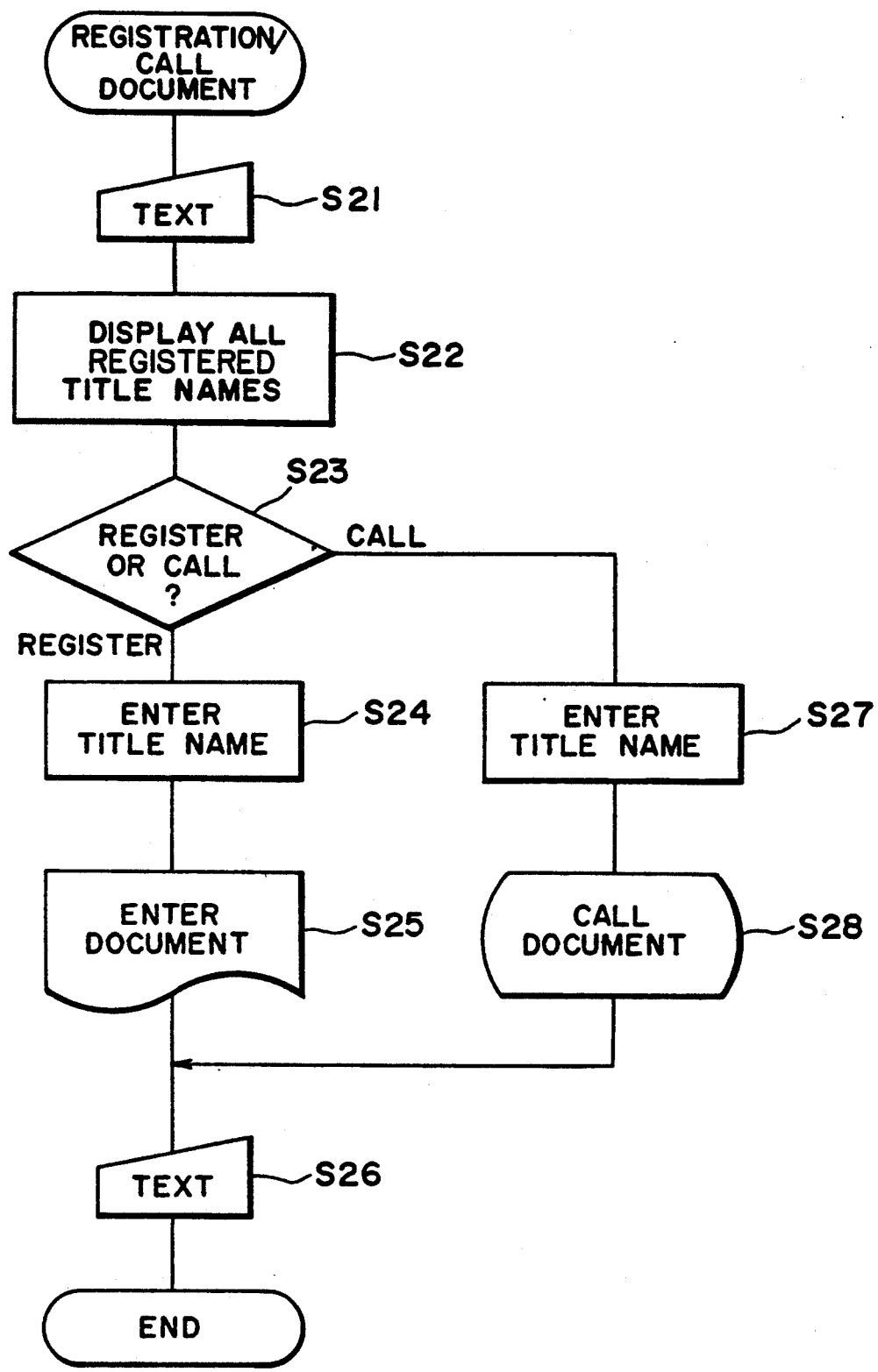
FIG. 6 is a flowchart showing an example of the document call/registration procedures in the character processing unit of the invention.

FIG. 6 shows an example of the document registration or call processing procedure in the present invention.

Figure 7A:
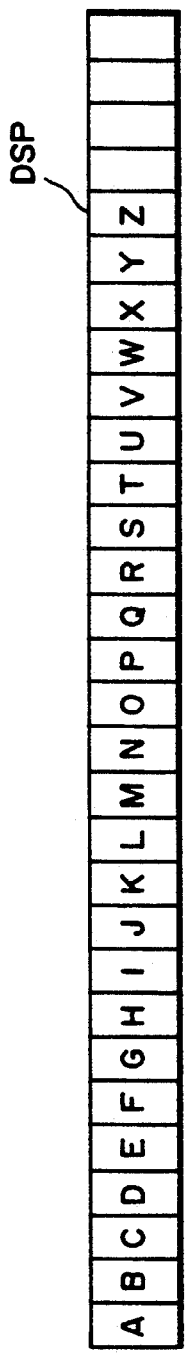
FIGS. 7A, 7B and 7C are diagrams to describe the relations between the title name and the display of the invention.
Figure 7B:
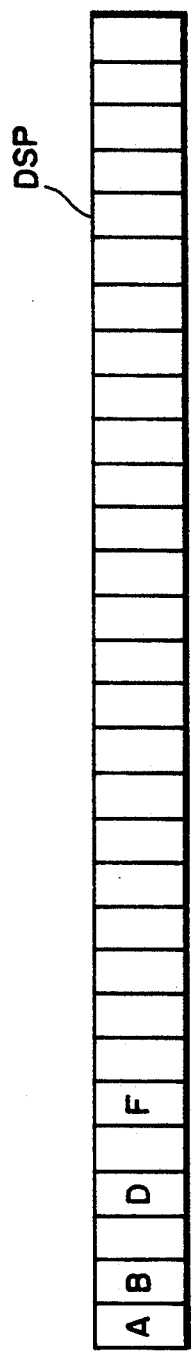

In FIG. 6, the key switch TEXT is pressed in step S21. In this step S21, after depression of the key switch TEXT, all of the title names of the registered documents will be immediately displayed in step S22. The display format in this case is such that, for example as shown in FIG. 7A, the display DSP has been preliminarily constituted so that it can sequentially indicate alphabetic characters A to Z from the leftmost segment thereof in the sequence of the alphabet, and that only the alphabetic characters as the title names registered among the alphabetic characters A to Z are displayed. For instance, when only the title names of A, B, D, and F have been registered, only A, B, D, and F are indicated in the respective relevant positions on the display DSP as shown in FIG. 7B, and the other alphabetic characters are not indicated.

Next, in step S23, the operator determines whether the document is registered or called. In case of registering the document, the processing advances to step S24 and in this step, it is possible to register the title names by key-entering the title names of, e.g., C, E, G to Z, which are not indicated as shown in FIG. 7B, through the character key group K2. The document entry is started in the next step S25 and upon completion of the document entry, the key switch TEXT is pressed again in step S26, thereby finishing the document registration processing.

On the other hand, to call the registered document in step S23, the operator key-enters the title name which he wants to call from among the title names which have been indicated on the display DSP in step S27, so that the processing advances to step S28. In this step, the document is called. At this time, the registered documents are corrected or printed, then the key switch TEXT is pressed in the next step S26 to complete the document call processing.

Figure 8:
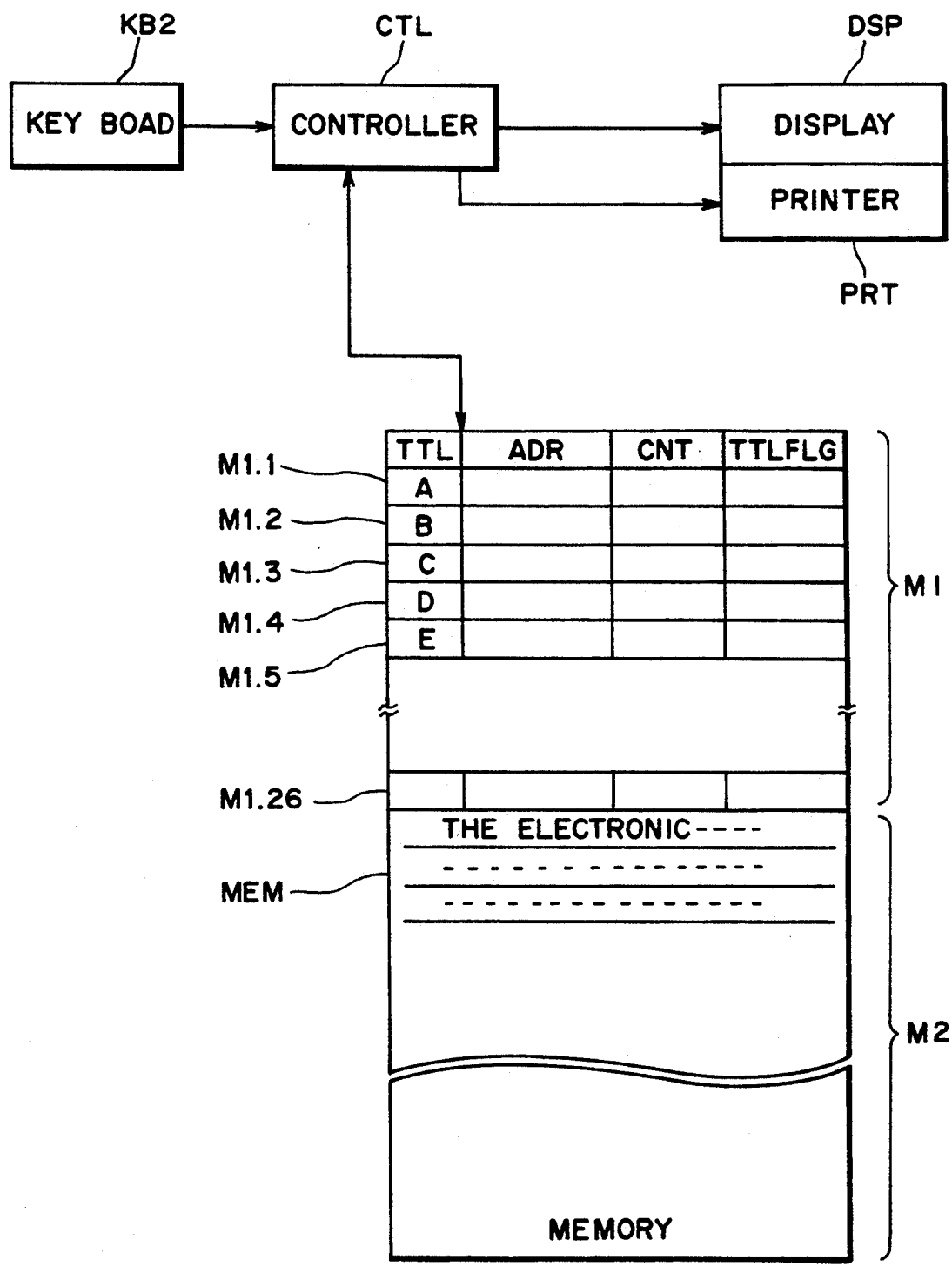
FIG. 8 is a block diagram showing an example of an arrangement of the character processing unit of the invention.

Referring now to FIG. 8, there is shown a constitution of one embodiment of the character processing unit of the present invention. In FIG. 8, the keyboard unit KB2 has the constitution shown in FIG. 5, while the display DSP has the constitution of FIG. 2. In FIG. 8, CTL denotes a controller; PRT is a printer; and MEM is a document memory device.

The information entered from the keyboard unit KB2 is processed in the controller CTL, thereby enabling the result to be transmitted to the display DSP, printer PRT and document memory device MEM. In addition, the controller CTL allows the information relative to the document from the document memory device MEM to be read out.

The document memory MEM is mainly divided into a directory section (header section) M1 and a substance section M2. The directory section M1 is a block for managing the substance section M2. The documents which were encoded in accordance with the ASCII codes or the like, namely, the character strings have been stored in the substance section M2.

Furthermore, the directory section M1 is provided with management data sections M1.1 to M1.26 for 26 respective documents. Each of these management data sections M1.1–M1.26 is constituted by subsections TTL for storing title names, ADR indicative of the top address of the document substance, CNT indicating a size of document substance, and TTLFLG representing the presence/absence of the registered documents.

In addition, as can be seen from FIG. 8, the controller CTL can write in or readout from any location in the document memory device MEM.

The relation between the controller CTL and the document memory device MEM will be described with respect to the portion relative to the invention. For this purpose, FIG. 9 shows the details of the controller CTL and document memory device MEM of the present invention.

Figure 9:
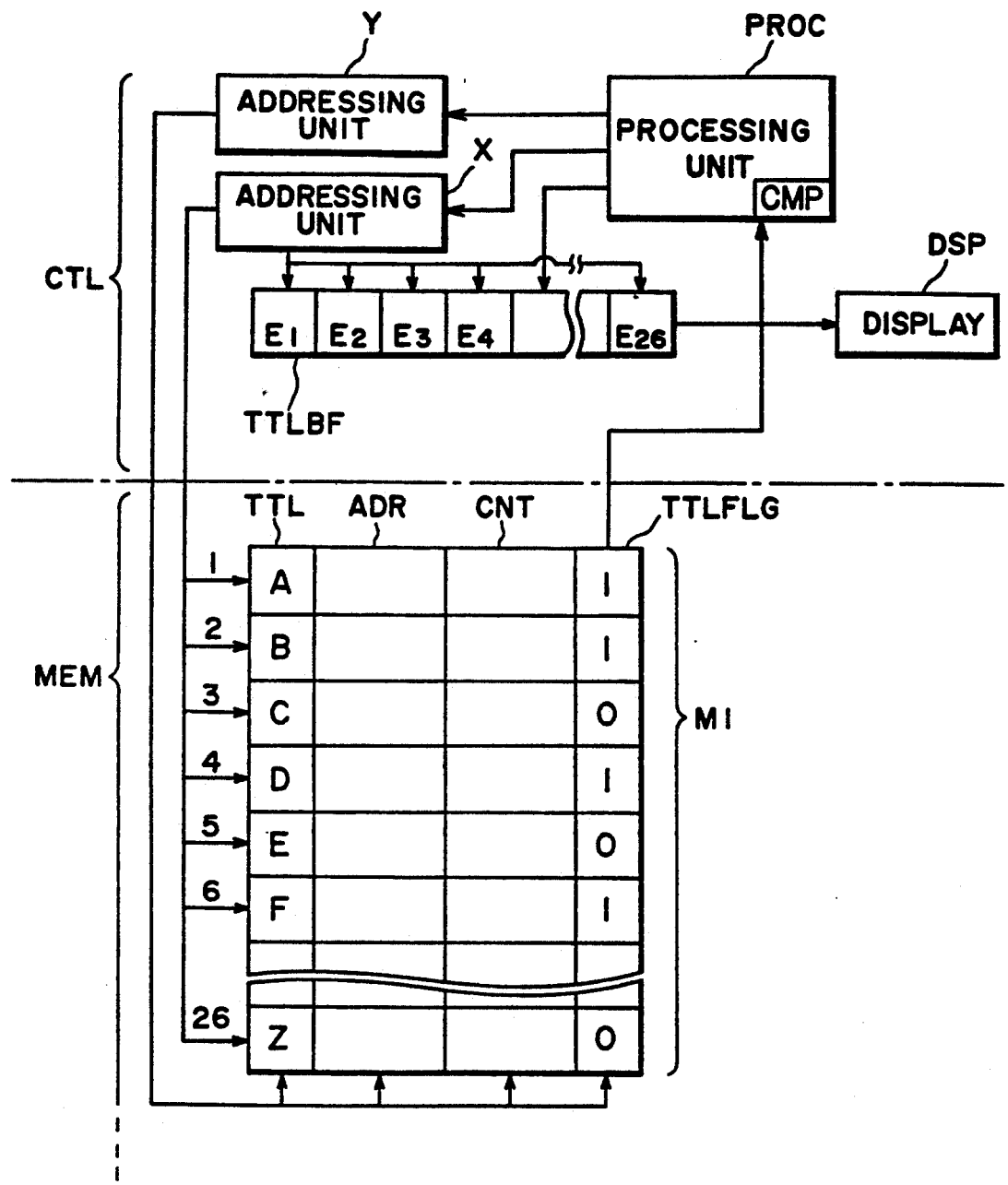
FIG. 9 is a block diagram showing detailed examples of a controller and a document memory device in the character processing unit of the invention.

In FIG. 9, X denotes an addressing unit for instructing the management data for every document, and Y represents an addressing unit for instructing any one of the title data TTL, ADR, CNT, and flag TTLFLG indicating the presence/absence of the registered titles in the management data section M1.1. A title data storage buffer TTLBF is a buffer register to temporarily store all titles TTL in the document memory device MEM. CMP is a comparator. On one hand, a processing unit PROC can arbitrarily give desired instructions to the addressing units X and Y and title buffer TTLBF as shown in the diagram.

Figure 10B:
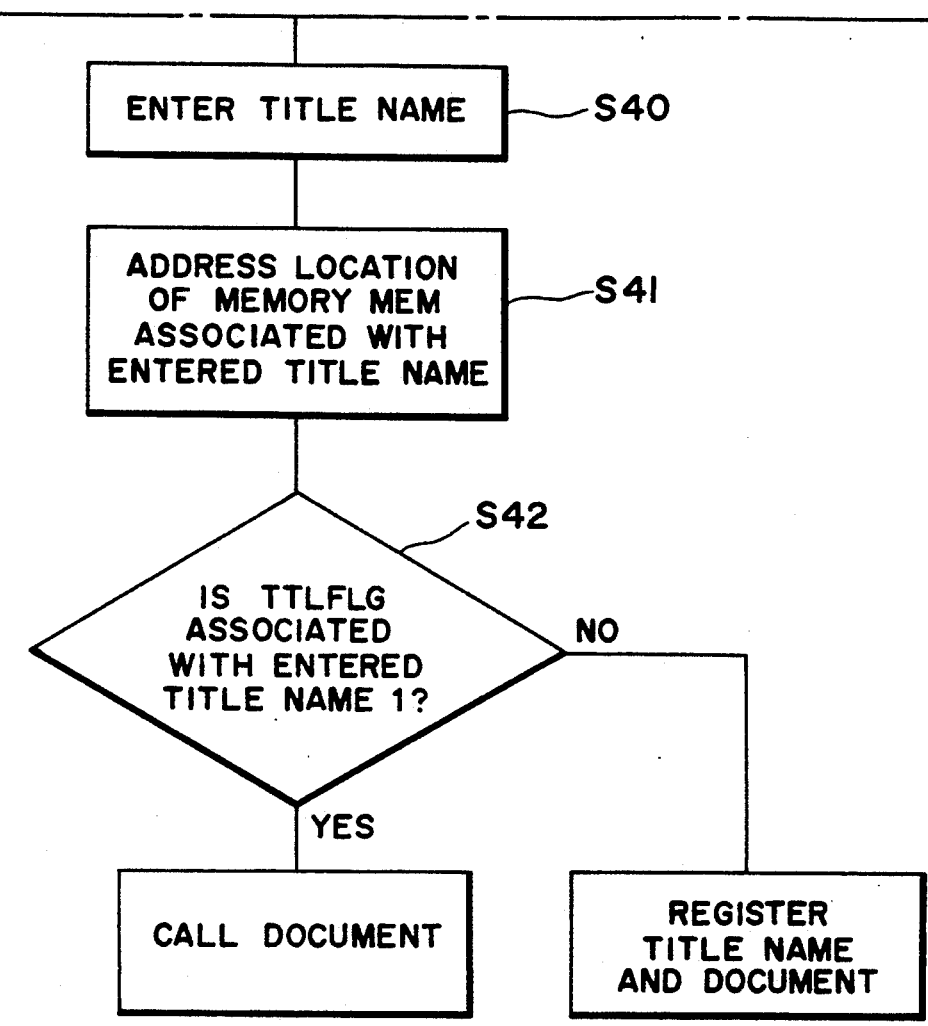
FIGS. 10A and 10B show a flowchart to describe the operations thereof when they are arranged according to FIG. 10.
Figure 10:
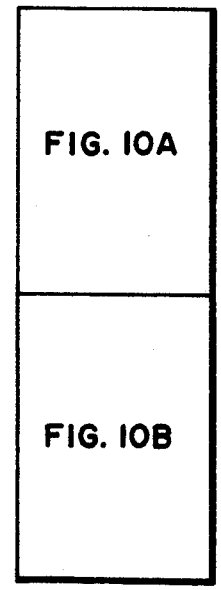
Figure 10A:
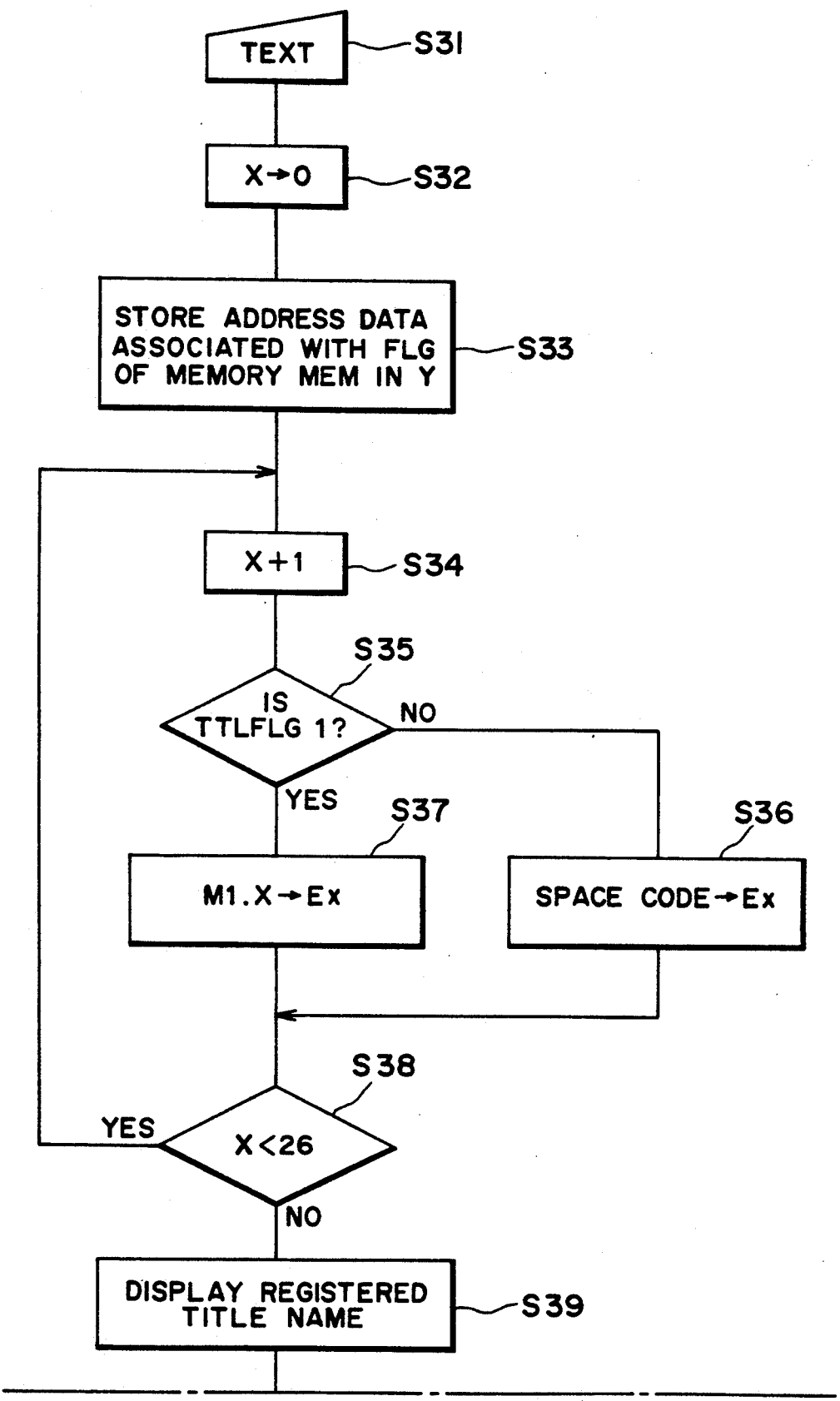

It is now assumed that the key switch TEXT was pressed in step S21 in FIG. 6. At this time, the processing unit PROC discriminates whether the TTLFLG of the management data section M1.1 is 0 or 1 while using the addressing units X and Y. An example of the processing procedure is shown in FIG. 10. Step S31 is the same as step S21 in FIG. 6.

The address content of the addressing unit X is set to 0 in step S32 and the address data of the flag FLG of the memory MEM is stored in the addressing unit Y in the next step S33. Then, the address is advanced by +1 in step S34. The flag TTLFLG is checked to see if it is "1" or not in the next step S35. When TTLFLG is 0, the ASCII code of space is stored in a register stage $E_x$ ($x=1$) of the buffer register TTLBF in step S36. On the contrary, when the TTLFLG is 1, the processing advances to step S37 and the ASCII code of the TTL data "A" of the management data section M1.x ($x=1$) is stored in the register stage $E_x$ (x=1) of the buffer register TTLBF. Subsequently, the processing advances from step S36 or S37 to step S38, where x is checked to see if it is 26 or not.

In this way, the processing in steps S34 to S38 is repeated until x=26, thereby sequentially comparing the TTLFLGs of the management data of the management data sections M1.1 to M1.26 and storing the character code or space code of the title name corresponding to each TTLFLG into the buffer register TTLBF. After the comparison storage processing of all management data is ended, the processing advances to step S39, where the content of the buffer register TTLBF is sent to the display DSP to indicate the registered title name.

The display DSP displays titles as shown in FIG. 7B in accordance with the processing as described above, so that the operator can see at one time all of the title names of the registered documents. In this state, pressing the character key of the title name displayed allows the processing to advance to step S40, so that the title name is entered. In step S41, the address location of the memory MEM associated with the entered title name is addressed. Next, in step S42, the TTLFLG associated with the entered title name is checked to see if it is "1" or not. In this case, since the TTLFLG is determined to be "1", the document is called. On the other hand, if the character key of the title name which is not displayed is pressed, the TTLFLG associated with the memory MEM is determined to be "0" in step S42, so that the document may be registered, then the operator may enter the document.

FIG. 11 shows an example of the flow of the processing procedure of the second embodiment according to the present invention.

In FIG. 11, the key switch TEXT is pressed in step S21. After the key switch TEXT was pressed in step S21, all, title names are immediately displayed in step S22' in which underlines are added to the title names of the registered documents.

Figure 7C:
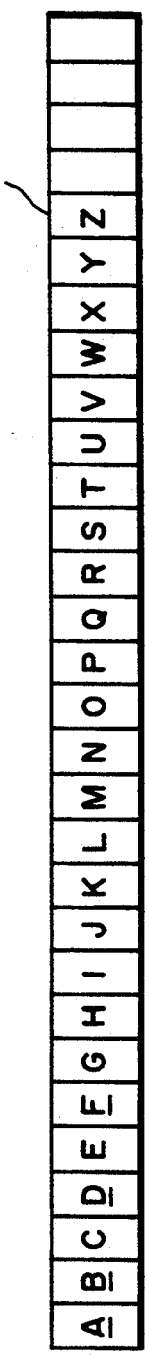

In this case, the display format is such that the display DSP is constituted so that alphabetic characters A to Z are sequentially indicated from the leftmost segment of the display DSP in accordance with the alphabet as shown in FIG. 7A, for example, and that the alphabetic characters as the registered title names among the alphabetic characters A to Z are displayed with, e.g., underlines. For instance, in the case where only the title names of A, B, D, and F have been registered, only A, B, D, and F are displayed with underlines on the display DSP as shown in FIG. 7C.

Next, in fashion similar to that explained with reference to FIG. 6, the operator determines whether the document is registered or called in step S23. In case of document registration, step S24 follows, where it is possible to register the document by key-entering the title names without underlines, for example, the title names of C, E, G-Z as shown in FIG. 7C through the character key group K2. The document entry is started in the next step S25 and upon completion of the document entry, the key switch TEXT is again pressed in step S26, thereby finishing the registration processing.

On the other hand, when calling the registered document in step S23, by key-entering the title names which the operator wants to call from among the title names with underlines displayed on the display DSP in step S27, the processing advances to step S28, where the document is called. The registered document is corrected or printed here and in the next step S26, the key switch TEXT is pressed to finish the document call processing.

Figure 12B:
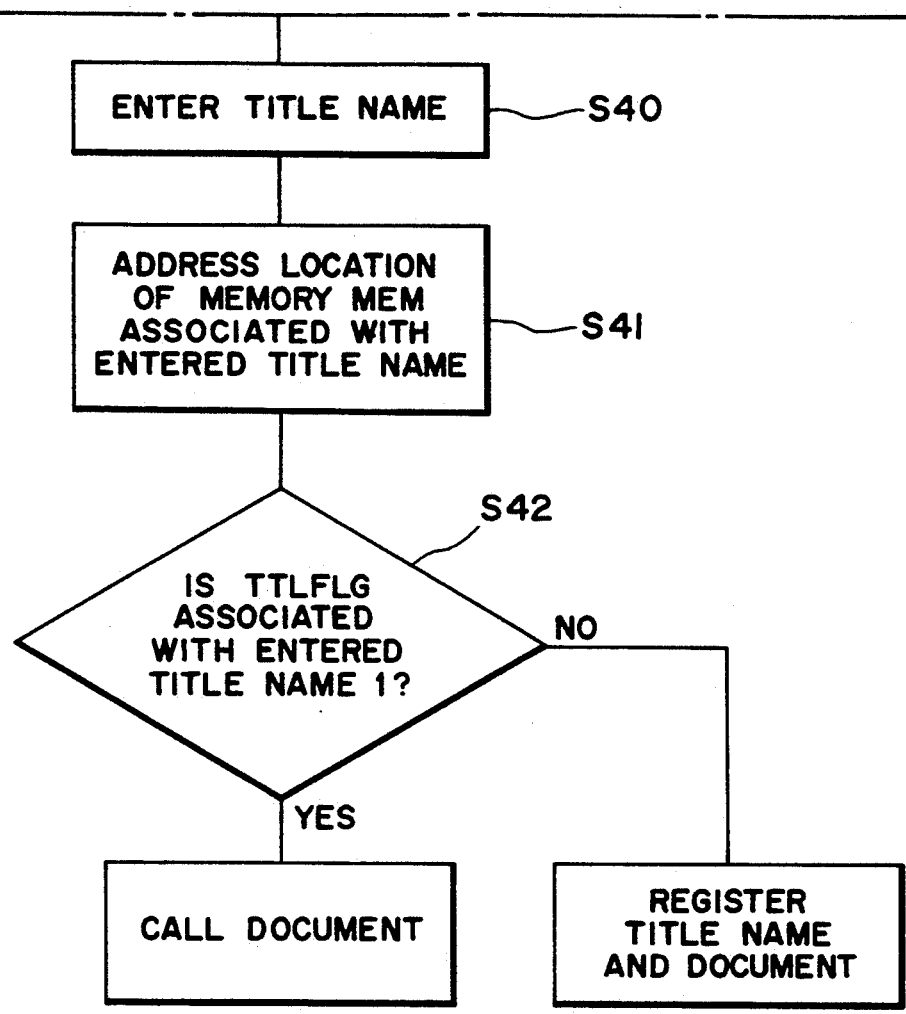
Figure 12:
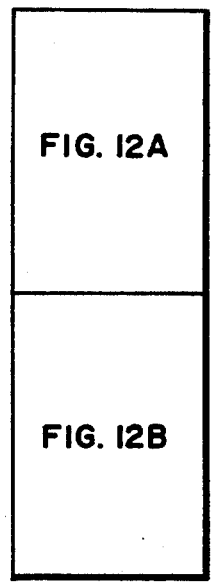
Figure 12A:
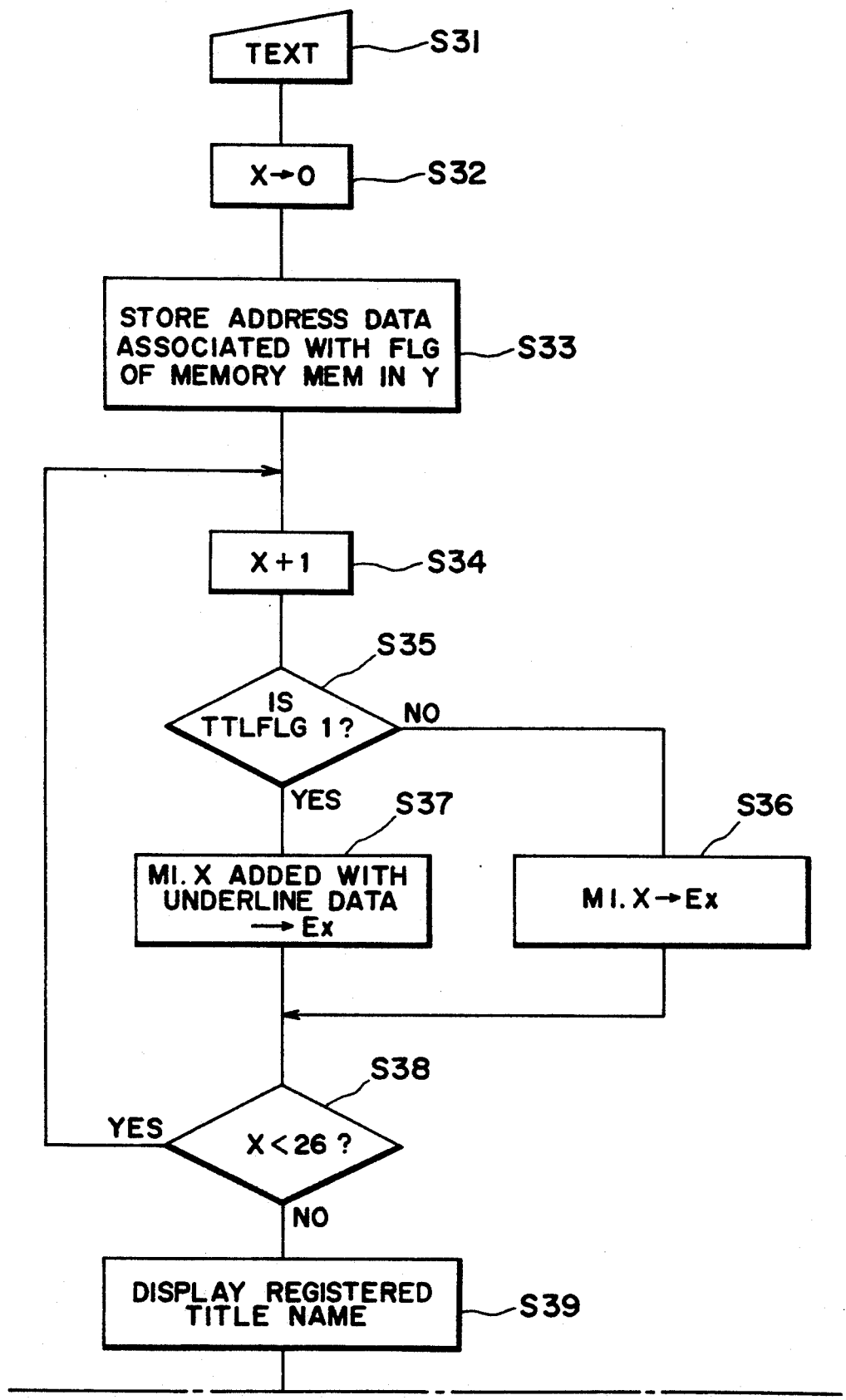

It is now assumed that the key switch TEXT was pressed in step S21 in FIG. 11. At this time, the processing unit PROC of FIG. 9 checks the TTLFLG of the management data section M1.1 to see if it is "0" or "1" while using the addressing units X and Y. FIG. 12 shows an example of the processing procedure. Step S31 is the same as step S21 in FIG. 6.

The address content of the addressing unit X is set to 0 in step S32 and the address data associated with the flag FLG of the memory MEM is stored in the address unit Y in the next step S33. Then, the address is advanced by +1 in step S34. The flag TTLFLG is checked in step S35 whether it is "1" or not. When the TTLFLG is 0, step S36 follows and the ASCII code of data "A" of the TTL of the management data section M1.x (x=1) is stored in the register stage $E_x$ (x=1) of the buffer register TTLBF. On the other hand, when the TTLFLG is 1, the processing advances to step S37, where the ASCII code with underline information of data "A" of the TTL of the management data section M1.x (x=1) is stored in the register stage $E_x$ (x=1) of the buffer register TTLBF. Subsequently, the processing advances from step S36 or S37 to step S38, where x is checked to see if it is 26 or not.

In this way, by repeating the processing in steps S36 to S38 until x=26, the TTLFLGs of the management data are sequentially compared from the management data sections M1.1 to M1.26 and the character code of the title name associated with each TTLFLG or the code of which the above title name was added with underline is stored in the buffer register TTLBF After completion of the comparison storage processing of all management data, the processing advances to step S39, where the content of the buffer register TTLBF is sent to the display DSP, thereby displaying all of the registered title names and unregistered title names.

The display DSP displays as shown in FIG. 7C on the basis of the processing as described above, so that the operator can see at a time all of the registered documents and unregistered documents. In this state, by pressing the character key of the title name with underline displayed, the processing advances to step S40, so that the title name is entered. In the next step S41, the address location of the memory MEM associated with the entered title name is addressed. Then, in Step 42, since the TTLFLG associated with the entered title name is determined to be "1", the document is called. On the other hand, when a character key of the title name without underline is pressed, the TTLFLG associated with the memory MEM is determined to be "0" in step S42, so that the document may be registered, and the operator may enter the document.

According to the present invention, with such a system constitution as described above, it is possible to eliminate the conventional drawback, i.e., complication such that the slide switch has to be switched whenever the document is registered and called. In addition, it is unnecessary for the operator to completely store the title names of the registered documents and the title names of the unregistered documents. Therefore, it is possible to register and call the documents by an extremely simple operation.

What is claimed is:

1. An electronic apparatus comprising:
   memory means including a memory for storing a fixed predetermined number of titles, a corresponding fixed predetermined number of representative data respectively corresponding to each of said titles, and a number of documents, said number of documents being equal to or less than said predetermined number of titles, each said representative data indicating whether or not the memory stores a document corresponding to the respective one of said titles, the memory having a document section and a title section, the document section storing the number of documents and the title section storing the predetermined number of titles and the corresponding predetermined number of representative data, display means for displaying one of said documents and a plurality of said titles;

instruction means for generating an instruction signal instructing the display of the plurality of titles;

control means, in response to the instruction signal generated by said instruction means, for classifying the predetermined number of titles into available titles and titles corresponding to stored documents by scanning each of said titles stored in the title section of the memory and reading the corresponding one of said representative data, and for causing said display means to display a plurality of said classified titles;

input means, in response to the display of the plurality of classified titles, for inputting a document and/or one of the predetermined number of titles;

determination means, in response to the input of one of the predetermined number of titles by said input means, for determining whether there is a stored document corresponding to said title input by said input means by scanning the title section of the memory for said input title and reading the corresponding representative data to generate determination data indicative of said determination; and mode control means, in response to said determination data, for entering said electronic apparatus into one of a reading operating mode for reading out one of said documents corresponding to said input title from the document section of the memory when said determination data indicates that a stored document corresponding to said input title exists, and a storing operating mode for storing a new document corresponding to said input title into the document section of the memory and for changing the representative data corresponding to said input title to indicate that said new document has been stored when said determination data indicates that a stored document corresponding to said input title does not exist.

2. An electronic apparatus according to claim 1, wherein said display means displays a plurality of title data which are titles determined by said determination means to have corresponding documents stored in said memory means.

3. An electronic apparatus according to claim 2, wherein the titles, as classified by said control means, determine whether a document is stored in said memory means, the title of which is one of said plurality of titles displayed by said display means.

4. An electronic apparatus comprising:
memory means including a memory for storing a fixed predetermined number of titles, a corresponding fixed predetermined number of representative data respectively corresponding to each of said titles, and a number of documents, said number of documents being equal to or less than said predetermined number of titles, each said representative data indicating whether or not the memory stores a document corresponding to the respective one of said titles, the memory having a document section and a title section, the document section storing the number of documents and the title section storing the predetermined number of titles and the corresponding predetermined number of representative data;

display means for displaying one of said documents and a plurality of said titles;

control means for classifying the predetermined number of titles into available titles and titles corresponding to stored documents by scanning each of said titles stored in the title section of the memory and reading the corresponding one of said representative data, and for causing said display means to display a plurality of said classified titles;

input means, in response to the display of the plurality of classified titles, for inputting a document and/or one of the predetermined number of titles;

determination means, in response to the input of one of the predetermined number of titles by said input means, for determining whether there is a stored document corresponding to said title input by said input means by scanning the title section of the memory for said input title and reading the corresponding representative data to generate determination data indicative of said determination; and mode control means, in response to said determination data, for entering said electronic apparatus into one of a reading operating mode for reading out one of said documents corresponding to said input title from the document section of the memory when said determination data indicates that a stored document corresponding to said input title exists, and a storing operating mode for storing a new document corresponding to said input title into the document section of the memory and for changing the representative data corresponding to said input title to indicate that said new document has been stored when said determination data indicates that a stored document corresponding to said input title does not exist.

5. An electronic apparatus according to claim 4, wherein said display means displays a plurality of titles which are titles determined by the determination means to have corresponding documents stored in said memory means.

6. An electronic apparatus comprising:
memory means including a memory for storing a fixed predetermined number of titles, a corresponding fixed predetermined number of representative data respectively corresponding to each of said titles, and a number of documents, said number of documents being equal to or less than said predetermined number of titles, each said representative data indicating whether or not the memory stores a document corresponding to the respective one of said titles, the memory having a document section and a title section, the document section storing the number of documents and the title section storing the predetermined number of titles and the corresponding predetermined number of representative data;

display means for displaying a plurality of characters;

designation means for selecting ones of said predetermined number of titles that correspond to stored documents by scanning each of said titles stored in the title section of the memory and reading the corresponding one of said representative data, and for generating a signal directing said display means to display as said plurality of characters the selected titles;

entering means, in response to the display of the selected titles, for entering characters;

decision means, in response to the entering of the characters by said entering means, for deciding whether or not the entered characters correspond to one of the selected titles displayed as said plurality of characters by said display means by scanning the title section of the memory for said entered characters and reading the corresponding representative data to generate a decision signal indicative of said decision; and control means, in response to said decision signal, for entering said electronic apparatus into one of a reading operating mode for reading out one of said documents corresponding to said entered characters from the document section of the memory when said decision signal indicates that one of said selected titles corresponding to said entered characters exists, and a storing operating mode for storing a new document corresponding to said entered characters into the document section of the memory and for changing the representative data corresponding to said entered characters to indicate that said new document has been stored when said decision signal indicates that one of said selected titles corresponding to said entered characters does not exist.

7. An electronic apparatus according to claim 6, wherein said designation means is a key switch.

8. An electronic apparatus according to claim 6, wherein said display means is a one line display.

9. A method comprising the steps of:

storing in a memory a fixed predetermined number of titles, a corresponding fixed predetermined number of representative data respectively corresponding to each of said titles, and a number of documents, said number of documents being equal to or less than said predetermined number of titles, each said representative data indicating whether or not the memory stores a document corresponding to the respective one of said titles, the memory having a document section and a title section, the document section storing the number of documents and the title section storing the predetermined number of titles and the corresponding predetermined number of representative data;

generating an instruction signal to display on display means a plurality of said titles;

classifying, in response to the instruction signal generated in said generating step, the predetermined number of titles in available titles and titles corresponding to stored documents by scanning each of said titles stored in the title section of the memory and reading the corresponding one of said representative data, and causing said display means to display a plurality of said classified titles;

inputting a document and/or one of the predetermined number of titles by input means in response to the display of the plurality of classified titles;

determining, in response to the input of one of the predetermined number of titles in said inputting step, whether there is a stored document corresponding to said title input by said input means by scanning the title section of the memory for said input title and reading the corresponding representative data to generate determination data indicative of said determination; and entering, in response to said determination data, said electronic apparatus into one of a reading operating mode for reading out one of said documents corresponding to said input title from the document section of the memory when said determination data indicates that a stored document corresponding to said input title exists, and a storing operating mode for storing a new document corresponding to said input title into the document section of the memory and for changing the representative data corresponding to said input title to indicate that said new document has been stored when said determination data indicates that a stored document corresponding to said input title does not exist.

10. A method comprising the steps of:

storing in a memory a fixed predetermined number of titles, a corresponding fixed predetermined number of representative data respectively corresponding to each of said titles, and a number of documents, said number of documents being equal to or less than said predetermined number of titles, each said representative data indicating whether or not the memory stores a document corresponding to the respective one of said titles, the memory having a document section and a title section, the document section storing the number of documents and the title section storing the predetermined number of titles and the corresponding predetermined number of representative data;

selecting ones of said predetermined number of titles that correspond to stored documents by scanning each of said titles stored in the title section of the memory and reading the corresponding one of said representative data, and generating a signal directing a display means to display as a plurality of characters the selected titles;

entering characters by entering means in response to the display of the selected titles;

deciding, in response to the entering of the characters in said entering step, whether or not the entered characters correspond to one of the selected titles displayed as said plurality of characters by said display means by scanning the title section of the memory for said entered characters and reading the corresponding representative data to generate a decision signal indicative of said decision; and entering, in response to said decision signal, said electronic apparatus into one of a reading operating mode for reading out one of said documents corresponding to said entered characters from the document section of the memory when said decision signal indicates that one of said selected titles corresponding to said entered characters exists, and a storing operating mode for storing a new document corresponding to said entered characters into the document section of the memory and for changing the representative data corresponding to said entered characters to indicate that said new document has been stored when said decision signal indicates that one of said selected titles corresponding to said entered characters does not exist.

* * * * *

UNITED STATES PATENT AND TRADEMARK OFFICE
CERTIFICATE OF CORRECTION

PATENT NO. : 5,319,790
DATED : June 7, 1994
INVENTOR(S) : Kumagai, Kaoru

It is certified that error appears in the above-indentified patent and that said Letters Patent is hereby corrected as shown below:

<u>On the Cover Page</u>

[57] ABSTRACT

Line 10, "entray" should read --entry--.

<u>SHEET 6 OF THE DRAWINGS</u>

In Fig. 8, "KEY BOAD" should read --KEYBOARD--.

<u>COLUMN 1</u>

Line 43, "P.Form" should read --P.FORM--.

<u>COLUMN 5</u>

Line 37, "all," should read --all--.

<u>COLUMN 6</u>

Line 33, "register TTLBF" should read --register TTLBF.--.
Line 47, "Step 42," should read --step S42,--.

UNITED STATES PATENT AND TRADEMARK OFFICE
CERTIFICATE OF CORRECTION

PATENT NO. : 5,319,790

DATED : June 7, 1994

INVENTOR(S) : Kumagai, Kaoru

It is certified that error appears in the above-indentified patent and that said Letters Patent is hereby corrected as shown below:

<u>COLUMN 7</u>

Line 13, "data," should read --data;--.

Signed and Sealed this

Tenth Day of January, 1995

Attest:

BRUCE LEHMAN

Attesting Officer

Commissioner of Patents and Trademarks